(12) United States Patent
Tande et al.

(10) Patent No.: US 10,017,428 B2
(45) Date of Patent: Jul. 10, 2018

(54) COMPOSITION COMPRISING AMMONIUM NITRATE-BASED PARTICLES AND A GELLING AGENT

(71) Applicant: YARA INTERNATIONAL ASA, Oslo (NO)

(72) Inventors: Terje Tande, Langesund (NO); Francois Ledoux, Cormeilles en Parisis (FR)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 15/325,793

(22) PCT Filed: Jul. 14, 2015

(86) PCT No.: PCT/EP2015/066040
§ 371 (c)(1),
(2) Date: Jan. 12, 2017

(87) PCT Pub. No.: WO2016/008875
PCT Pub. Date: Jan. 21, 2016

(65) Prior Publication Data
US 2017/0166489 A1 Jun. 15, 2017

(30) Foreign Application Priority Data
Jul. 14, 2014 (NO) .................................. 20140895

(51) Int. Cl.
*C05G 3/00* (2006.01)
*C01C 1/18* (2006.01)
*C05C 1/02* (2006.01)

(52) U.S. Cl.
CPC .............. *C05G 3/0047* (2013.01); *C01C 1/18* (2013.01); *C01C 1/185* (2013.01); *C05C 1/02* (2013.01);
(Continued)

(58) Field of Classification Search
None
See application file for complete search history.

(56) References Cited

U.S. PATENT DOCUMENTS

| 3,105,754 A | 10/1963 | Marx |
| 3,640,784 A * | 2/1972 | Yancik .................... C06B 31/30 149/112 |

(Continued)

FOREIGN PATENT DOCUMENTS

| CN | 103880507 | 6/2014 |
| DE | 2360851 | 7/1974 |

(Continued)

OTHER PUBLICATIONS

International Search Report and Written Opinion of the International Searching Authority dated Oct. 1, 2015 in International (PCT) Application No. PCT/EP2015/066040.

(Continued)

*Primary Examiner* — Wayne Langel
(74) *Attorney, Agent, or Firm* — Wenderoth, Lind & Ponack, L.L.P.

(57) ABSTRACT

The present invention relates to a solid, particulate, non-explosive composition comprising ammonium nitrate-based particles, in particular a fertilizer composition, of which, on the one hand, the potential misuse as a precursor for an explosive composition is limited without, on the other hand, hampering its legitimate use by farmers for food production. The solid, particulate, non-explosive composition further comprises a gelling agent which is able to form a substantially water-insoluble and non-filterable hydrogel after the solid fertilizer composition is contacted with water. The gelling agent is selected from the group of gum-based
(Continued)

gelling agents, in particular xanthan gum-based agents and guar gum-based agents, most preferably is a xanthan gum-based agent.

21 Claims, 1 Drawing Sheet

(52) U.S. Cl.
CPC ......... *C05G 3/0029* (2013.01); *C05G 3/0041* (2013.01)

(56) References Cited

U.S. PATENT DOCUMENTS

| | | | | |
|---|---|---|---|---|
| 3,852,055 | A * | 12/1974 | Hawkes | C05C 1/02 |
| | | | | 71/59 |
| 3,950,159 | A | 4/1976 | Fox et al. | |
| 4,019,934 | A * | 4/1977 | Takayama | C05C 1/00 |
| | | | | 149/43 |
| 4,202,683 | A * | 5/1980 | Schuman | C05B 7/00 |
| | | | | 71/34 |
| 4,367,104 | A * | 1/1983 | Paton | B02C 23/06 |
| | | | | 149/11 |
| 4,933,029 | A * | 6/1990 | Sheeran | C06B 31/285 |
| | | | | 149/21 |
| 5,552,462 | A | 9/1996 | Yeh | |
| 6,669,753 | B1 | 12/2003 | Chambers et al. | |
| 2006/0243010 | A1 | 11/2006 | Sanders et al. | |
| 2007/0044528 | A1 * | 3/2007 | Kitchen | C05G 3/0047 |
| | | | | 71/28 |
| 2008/0223098 | A1 | 9/2008 | Taulbee | |
| 2012/0138848 | A1 | 6/2012 | Leavitt et al. | |
| 2015/0135786 | A1 * | 5/2015 | Weaver | C05C 1/00 |
| | | | | 71/50 |
| 2015/0329435 | A1 * | 11/2015 | Hardy | A01N 25/04 |
| | | | | 424/529 |

FOREIGN PATENT DOCUMENTS

| | | |
|---|---|---|
| GB | 881517 | 11/1961 |
| JP | 10101465 | 4/1998 |
| RU | 2281274 | 8/2006 |
| WO | 02/090296 | 11/2002 |

OTHER PUBLICATIONS

Written Opinion of the International Preliminary Examining Authority dated Jun. 6, 2016 in International (PCT) Application No. PCT/EP2015/066040.
International Preliminary Report on Patentability dated Oct. 26, 2016 in International (PCT) Application No. PCT/EP2015/066040.
Norwegian Search Report dated Feb. 4, 2017 in corresponding Norwegian Application No. 20140895 (with partial English translation).

* cited by examiner

COMPOSITION COMPRISING AMMONIUM NITRATE-BASED PARTICLES AND A GELLING AGENT

FIELD OF THE INVENTION

The present invention relates to a solid, particulate, non-explosive composition comprising ammonium nitrate-based particles, in particular an ammonium nitrate-based fertilizer composition, of which, on the one hand, the potential misuse as a precursor for an explosive composition is limited without, on the other hand, hampering its legitimate use by farmers for food production.

BACKGROUND OF THE INVENTION

Ammonium nitrate (AN), with the chemical formula $NH_4NO_3$, is a worldwide available chemical compound, produced in millions of tons every year. Its main use is as a fertilizer, and therefore it is widely available and easily accessible in many countries around the world. Its second main use is for the manufacture of explosives, that is by definition very closely controlled.

An undesired use is for the production of home-made explosives (HME's) such as a mixture of ammonium nitrate and fuel oil, also called 'ANFO', or a mixture of ammonium nitrate and nitro methane, also called 'ANNM'. The recipes of the HME's are publically available, for example on the Internet. In practice, to produce an HME on the basis of an AN-based fertilizer is rather straightforward, and misuse of AN-based fertilizer into explosives occurs too frequently, especially in the context of terroristic attacks, but also by farmers for various blasting purposes, by children or students experimenting with explosives, for example in the production of (illegal) fireworks.

To limit its misuse, many countries have banned the use of pure AN as a fertilizer by limiting the nitrogen content of AN-based fertilizer. A typical fertilizer formula is the so-called calcium ammonium nitrate (CAN) which is a mix of ammonium nitrate with a carbonaceous filler such as limestone or dolomite and with a maximum AN-content of 80 weight %. Different CAN grades exist, having a varying amount of nitrogen.

Moreover, such a CAN-fertilizer has the advantage that it is an excellent fertilizer, bringing nitrogen to the plant in a readily available form. It also brings some valuable calcium and/or magnesium. Furthermore, it is well-balanced regarding soil pH, avoiding the natural acidification of the soil caused by some nitrogenous fertilizers such as urea, this due to the conversion of ammonium nitrogen into nitrate nitrogen, to be assimilated by plants. Liming is in fact already included in the product.

Many other AN-based fertilizer exist, not only straight nitrogen (N) fertilizers (with different degrees of N-dilution by a filler or containing secondary nutrients such as e.g. sulphur), but also NPK (indifferently NPK, NP, NK) and especially high N-NPK fertilizers. All of them can be misused, but of course, the preferred choice for a potential misuse would logically be to opt for a fertilizer which is the most concentrated in ammonium nitrate, i.e. a straight AN-fertilizer or a CAN-fertilizer. However, the current invention is applicable to all AN-based fertilizers, as long as they contain a certain amount of ammonium nitrate.

There are basically two routes to convert an AN-based fertilizer such as a CAN-fertilizer into AN, suitable for home-made explosives, i.e.:

(1) A dry route (also called grinding route), wherein the granules or brills of the AN-based fertilizer such as a CAN-fertilizer—are simply crushed and later mixed with other compounds such as oil or aluminium powder;

(2) A wet route (also called solution processing route), wherein the optionally grinded granules or prills of the fertilizer are first dissolved into water, the solution is allowed to settle and the insoluble components such as limestone or dolomite can be filtered out (AN is highly soluble in water (1920 g/l at 20° C.); calcium and magnesium carbonates are poorly soluble in water). In that way, one can recover an aqueous solution of ammonium nitrate, that can be evaporated to get a concentrated ammonium nitrate product. This concentrated ammonium nitrate product is more concentrated than the ammonium nitrate product obtained by means of the dry route. The wet route requires more process steps, but definitively allow obtaining a more powerful home-made explosive.

Therefore, there exists a need to limit as much as possible the potential misuse of AN-based fertilizers, in particular of CAN-fertilizers, as a precursor for an explosive on the one hand, without hampering their legitimate use by farmers for food production on the other hand, especially when the wet route is used to convert an AN-based fertilizer.

PRIOR ART

The use of gums in combination with ammonium nitrate is known in explosive ammonium nitrate compositions.

An explosive composition in slurry or gel form comprising a substantial proportion of ammonium nitrate and a thickener of gum is disclosed in U.S. Pat. No. 3,660,182 (Intermountain Research and Engineering Co, Inc, 1972). Such a slurry type blasting composition is used in hard rock mining and excavation operations.

A water resistant explosive composition is disclosed for use in wet blasting holes in U.S. Pat. No. 4,693,763 (Les Explosifs Nordex Ltee/Nordex Explosives Ltd., 1987). The composition comprises ammonium nitrate prills coated with a glycol and oil emulsion to render the prills waterproof. The coated prills are mixed with quick hydrating and self-complexing guar gums. The liquid composition can be poured directly into water filled blasting holes. The guar gums in the presence of cross-linking agent form a gel in the bore hole to lend stability to the composition until exploded. The composition has excellent shooting properties.

Explosive ammonium nitrate compositions are excluded from the scope of the current patent application.

U.S. Pat. No. 3,105,754 (Phillips Petroleum Company, 1963) discloses a composition for retarding the solubility of nitrogen-containing fertilizers, wherein urea, being a water-soluble nitrogen-containing compound, is melted and mixed with 5 weight % of a gelation agent to form large discs. There is no mentioning in the document or in the examples of non-explosive fertilizer compositions comprising a maximum carbon content of 0.4 weight %.

JP10101465 also relates to a controlled release fertilizer by combining the fertilizer component and a mineral component with a biodegradable polymer or a plastic component. The biodegradable polymer may be a guar or xanthan gum (an acetylated starch is exemplified), but the function of the polymer is that it hinders the penetration of water by filling the voids in the minerals. Powdery hydrated silicate minerals and siliceous materials are preferred as the mineral component.

US 2012/0138848 (Leavitt and Bergida, 2012) discloses safe, stable, non-toxic, non-explosive and recyclable cooling compositions comprising intimately mixed solid particulate compounds with a mesh size of at least 100 mesh (less than 149 μm) and preferably more than 200 mesh (less than 74 μm) that undergo an endothermic process when mixed with water such that the resulting mixture is useful for cooling surfaces, liquids and solids when activated upon mixing with water. The compositions always include one or more endothermic compounds that contain potassium, one or more endothermic compounds that contain nitrogen, and one or more endothermic compounds that contain an ammonium phosphate. A composition is disclosed comprising 50 parts of ammonium nitrate and 1 part guar or xanthate powder as a thickening agent, in the form of a 100 mesh powder. After the composition has been dissolved in water, the saturated solution may form a liquid NPK fertilizer.

The object of the present invention is to provide a solid, particulate, non-explosive composition, such as prills and/or granules, comprising ammonium nitrate-based particles and a gelling agent, wherein the composition has a maximum carbon content of 0.4 weight %, and an average particle size of at least 1 mm.

DESCRIPTION OF THE INVENTION

According to one aspect of the invention, a solid, particulate, non-explosive composition comprising ammonium nitrate-based particles is provided, further comprising a gelling agent which is able to form a substantially water-insoluble and non-filterable hydrogel after the solid composition is contacted with water.

According to another aspect of the present invention, a solid, particulate, non-explosive composition comprising ammonium nitrate-based particles is provided, which composition is not easily converted into an explosive concentrated ammonium nitrate composition.

The term "a substantially water-insoluble and non-filterable hydrogel" in the light of the invention is to be interpreted two-fold: When adding water to a solid composition comprising ammonium nitrate-based particles and the gelling agent according to the invention in order to produce a solution, firstly, the viscosity of the obtained solution is considerably increased as the water with the dissolved ammonium nitrate is gelled. In this way, the recovery of the ammonium nitrate from the highly viscous gelled solution is seriously hampered. Secondly, the highly viscous gelled solution effectively prevents filtration of said viscous solution to remove the solids from the ammonium nitrate composition, such as limestone or dolomite. Adding water to the solid composition will result in a hydrogel that is difficult or not at all dissolvable in water and that is difficult or not at all filterable, instead of obtaining an aqueous liquid that has a low viscosity and is easy to filter to remove the insoluble components therefrom. All this makes the reprocessing of the composition into HME more complicated, requiring more efforts and possibly, leading to a lower recovery. By recovery is meant the fraction of ammonium nitrate that is recovered for HME preparation out of the original composition, expressed as AN-yield. For example, if 25 kg of ammonium nitrate are recovered out of 100 kg CAN, the AN-yield is about 33%, since there are about 75 kg AN contained in the 100 kg CAN.

According to one embodiment of a solid, particulate, non-explosive composition comprising ammonium nitrate-based particles according to the invention, the gelling agent is a carbon-based gelling agent.

In a favourable embodiment of a solid, particulate, non-explosive composition comprising ammonium nitrate-based particles according to the invention, the gelling agent is selected from the group of gum-based gelling agents. In a favourable embodiment of a solid, particulate, non-explosive composition comprising ammonium nitrate-based particles according to the invention, the gelling agent is selected from the group of xanthan gum-based gelling agents and guar gum-based gelling agents, most preferably is a xanthan gum-based gelling agent. Xanthan gum is a polysaccharide that is secreted by the bacterium *Xanthomonas campestris*. Said gums are naturally well biodegradable and do not hamper agricultural use of the composition when used as a fertilizer.

In an advantageous embodiment of a solid, particulate, non-explosive composition comprising ammonium nitrate-based particles according to the invention, the gelling agent is selected from the group of guar gum-based gelling agents. Guar gum is a polysaccharide composed of the sugars galactose and mannose.

Due to current legal limits on carbon content in fertilizer compositions (max 0.4% organic/combustible substances, including any organic substance, calculated as carbon to the exclusion of any other substance, of the total composition), the amount of organic carbon-based gelling agent, in particular xanthan gum-based gelling agent, can be selected up to a maximum of 0.7 weight %, relative to the total weight of the composition. However, tests were also done with higher amounts (1.25 and 2.50 weight %) to assess the potential of the gum-based gelling agents (xanthan and guar).

Within the context of this application, the solid, particulate composition comprising ammonium nitrate-based particles is a non-explosive composition, i.e. a composition that cannot be used as such as an explosive. In particular, the solid, particulate composition comprising ammonium nitrate-based particles has a maximum carbon content of 0.4%, relative to the total weight of the composition, wherein the carbon is defined as above, in particular as originating from organic/combustible substances. Such a solid particulate composition comprising ammonium nitrate-based particles is not an explosive solid particulate composition comprising ammonium nitrate-based particles. Explosive compositions based on ammonium nitrate are excluded from the scope of the current invention.

Within the context of this application, with composition comprising ammonium nitrate-based particles, is meant a composition comprising at least ammonium nitrate, in particular calcium ammonium nitrate, as discussed above. For the purpose of this invention, an composition comprising ammonium nitrate, either from the prior art or the claimed composition as defined in this application, is defined as a composition comprising at least 50 weight % of ammonium nitrate, preferably at least 60 weight %, more preferably at least 70 weight %, even more preferably at least 80 weight %, most preferably at least 90 weight %, relative to the total weight of the composition. The composition may also contain other components, such that the composition is characterized as a fertilizer, selected from the group of an N-fertilizer, a CAN-fertilizer, an NPK-fertilizer, an NP-fertilizer and/or a high N-NPK-fertilizer.

The solid composition according to the invention has the form of a particulate composition. According to the invention, the solid composition, i.e. the particles that make up the solid composition, has an average particle size of at least 1 mm, preferably ranging from 1 to 25 mm, or more preferably ranging from 2 to 8 mm. Preferably, the average particle size is an average diameter as determined by sieving, ranging from 1 to 25 mm, preferably from 2 to 8 mm.

The average diameter, as well as the size distribution, is determined using a series of sieves with appropriate mesh sizes.

The solid, particulate, solid non-explosive composition according to the invention can easily be made according to standard procedures. With reference to its use as a fertilizer, according to one embodiment, the gum-based gelling agent is a solid particulate material that is mixed with the fertilizer prills or granules in a mixing or coating step, using, e.g. a tumbler or the like. It is standard practice to add a surface powder, for example talcum, on the fertilizer prills or granules to prevent e.g. caking. The application of said particulate gum-based gelling agent can be performed in a similar way and in a similar type of equipment, such that the fertilizer prills or granules, in particular the ammonium nitrate-based particles, comprise a coating of the gelling agent. According to an alternative embodiment, the particulate gum-based gelling agent can be suspended in a liquid, and the resulting suspension is sprayed onto the fertilizer prills or granules, such that the fertilizer prills or granules, in particular the ammonium nitrate-based particles, comprise a coating of the gelling agent. According to yet another embodiment, the gum-based gelling agent is introduced at the granulation stage in a melt mixture and is integrated within the fertilizer particles, in particular the ammonium nitrate-based particles. According to yet another but less preferred embodiment a physical blend of granules of the gum-based gelling agent with the AN-based particles is made, of course making sure the gum-based gelling agent particles have similar appearance (at least size, colour and density) as the AN-based particles in order to avoid segregation during handling as well as easy pick-out.

The invention also relates to the use of a gelling agent which is able to form a substantially water-insoluble and non-filterable hydrogel, for the manufacture of a solid non-explosive composition comprising ammonium nitrate-based particles, for limiting its potential misuse as a precursor for an explosive composition. According to the invention, the solid non-explosive composition has a maximum carbon content of 0.4 weight %.

Preferably, the gelling agent is selected from the group of gum-based gelling agents, in particular xanthan gum-based gelling agents and guar gum-based gelling agents, most preferably is a xanthan gum-based gelling agent.

According to one aspect, the composition according to the invention is used as a non-explosive fertilizer composition for limiting its potential misuse as a precursor for an explosive composition. Preferably, the non-explosive fertilizer composition is selected from the group of a straight N-fertilizer, a CAN-fertilizer, an NPK-fertilizer, an NP-fertilizer and/or a high N-NPK-fertilizer.

According to a further aspect, the composition according to the invention can be used as a slow release, a sustained release or a controlled release ammonium-nitrate based fertilizer.

EXAMPLES

Example 1

Figure 1:
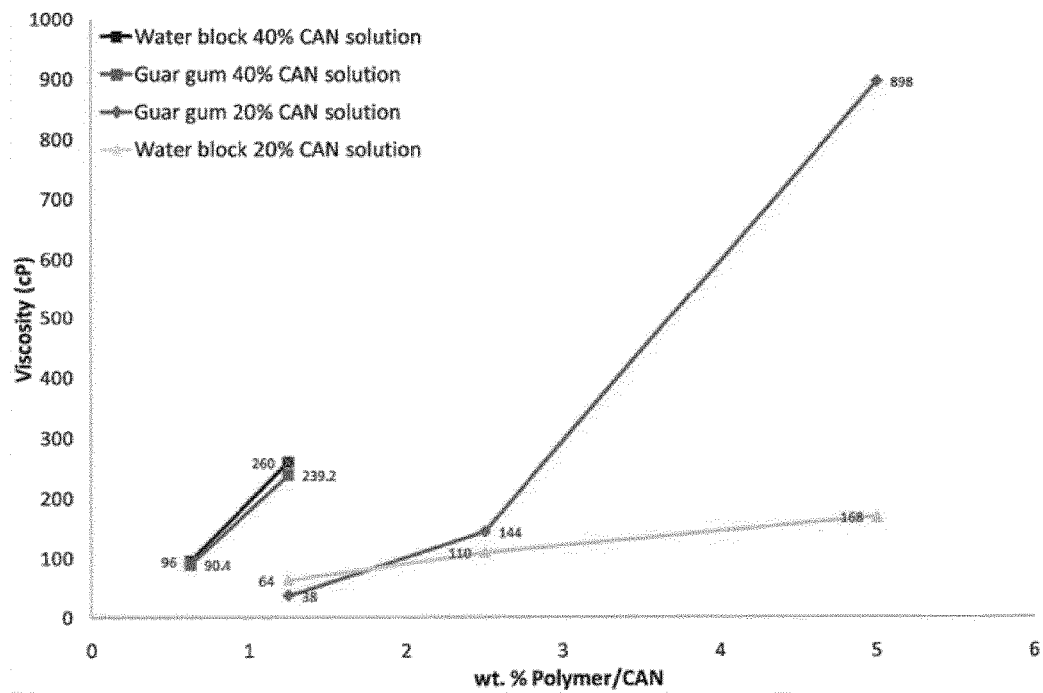
FIG. 1 illustrates the viscosity versus weight % agent per CAN in Experiment 1.3

Identification of the Gelling Agent According to the Invention

An array of gelling agents was screened to identify the gelling agent according to the invention, which quickly forms a highly viscous gel. Such gelling agent, when added to CAN fertilizer, would prevent its dissolution in excess water or filtration of insoluble particle in order to isolate highly concentrated ammonium nitrate. The gelling properties of six gelling agents were investigated in 20 weight % CAN solutions. Only two gelling agents proved to be effective, being the gum type of gelling agents, and of these, the WB2 Water Block™ (identified as xanthan gum) from Rantec Corporation (PO Box 729, Ranchester, Wyo. 82839) proved to work best at lowest loadings. Therefore, its performance was tested at demanding conditions of increased temperature, prolonged time and vacuum filtration. Overall, WB2 Water Block™0 showed very promising results in preventing misuse of CAN fertilizer for isolation of ammonium nitrate. The selection of the gum type of gelling agent was surprising, probably due to the specific interaction of ammonium nitrate with the gum molecules.

Material

Coated CAN, supplied by Rostock, was used having an average particle size of at least 1 mm. Gelling agents and their suppliers are listed in Table 1.

Techniques

Sample preparation: A 600 ml Schott beaker was used for the preparation of 500 ml of a 1 weight % solution of a gelling agent in water. 5 g of powder was dropped in 495 ml of water and stirred with a glass rod. The beaker was then placed on a jack and stirred with overhead propeller located closely, but not touching, the bottom of the beaker.

Ethanol moistening of the gelling agent powder prior to dissolution proved to be rather contra-productive—it lead to formation of clumps which then took longer time to dissolve. It was therefore abandoned after the first 2 tests.

For viscosity measurement in the presence of CAN, 100 g of CAN was weighted and 5 g of gelling agent was added to the CAN in a plastic jar. The powder was dispersed by vigorous shaking of the jar. The content of the jar was then transferred to 400 ml of water while stirring (20 weight %). Solids were mechanically stirred for 10 minutes, after which all CAN was dissolved and viscosity could be measured. The same procedure was followed to prepare the 20 weight % and 40 weight % of CAN solutions with varying loadings of gelling agents.

Solubility: The aqueous solution was stirred at the lowest stirrer setting for 5 minutes. The solution was then visually inspected for the presence of undissolved material. Pictures of the solution were taken. For 20 weight % and 40 weight % CAN solutions, a higher stirring speed was used.

Viscosity: A Brookfield viscometer was used to measure viscosity of every solution after 5, 10 and 15 minutes during stirring. A large disc (S02) was used where possible at appropriate rotational speed setting. Use of other discs is mentioned explicitly in the text below. The disc was not cleaned between the measurements of the same sample.

Settling: The solution was allowed to settle for 30 minutes. Settling was evaluated visually and a picture was taken.

Filtration: Rough folded paper (black ribbon) filter in an ordinary PE funnel was used for filtration. Solution was transferred into the filter and the filterability was visually observed. The amounts of filtrate over a given time period were measured. Pictures were taken. For vacuum filtration, 110 mm black ribbon filter paper was used.

Solids: In case of CAN mixtures, the filtrate was left to evaporate in a heated cabinet (105° C.) overnight and the precipitate was weighed to determine the amount of filtered CAN.

ered as filter cake. Disregarding the undissolved particles, it would seem that CAN contained about 30 weight % of insoluble material. The filtrate was evaporated at 105° C. to dryness. 142 g of solid ammonium nitrate was thus obtained (71% recovery). This amount was used as a reference for calculating the recoverable amount of CAN in the presence of gelling agents.

TABLE 1

| Nr. | Sample name | Supplier | Viscosity at: 5 min | 10 min | 15 min | Settling after 30 min | Filtrate (ml) |
|---|---|---|---|---|---|---|---|
| 1 | Guar gum | Sigma | 112 | 520 | 1,048 | Negligible | 18 |
| 2 | Bentonite, sodium form | Alfa Aesar | 8 | 8 | 8 | Negligible | 300 |
| 3 | Water Block UFFHV Guar Gum | Rantex Corp. | 6,280 | 7,704 | 9,200 | None | 6 |
| 4 | Water Block PPN4000 Guar Gum | Rantex Corp. | 5,920 | 7,264 | 7,592 | None | 6 |
| 5 | Water Block DIF Guar Gum | Rantex Corp. | 2,888 | 3,592 | 3,880 | None | 8 |
| 6 | Water Block WB2 Xanthan Gum | Rantex Corp. | 40 | 152 | 344 | Floating | 30/150 |
| 7 | Guar Gum GV23/2F | Chemcolloids Ltd. | 3,912 | 4,464 | 5,216 | None | 6.5 |
| 8 | Bentonite | Sigma Aldrich | 0 | 0 | 4 | Partial | 390 |
| 9 | Nanoclay hydrophilic Bentonite | Aldrich | 4 | 4 | 4 | Partial | 350 |
| 10 | Attagel 50 | BASF | 8 | 8 | 8 | Complete | 470 |
| 11 | Attagel 350 | BASF | 8 | 8 | 8 | Complete | 470 |
| 12 | Algenic acid sodium salt, low viscosity | Alfa Aesar | 16 | 16 | 16 | N/A | 480 |
| 13 | Algenic acid sodium salt, very low viscosity | Alfa Aesar | 8 | 8 | 8 | Floating | 480 |
| 14 | Sodium alginate | VWR-Prolabo | 32 | 16 | 32 | Floating | 405 |
| 15 | SAP: Poly(isobutylene-co-maleic acid) sodium salt (Sigma 424277) | Sigma | 149,000 | 86,000 | 68,000 | None | 0 |
| 16 | SAP: Poly(acrylic acid), partial sodium salt-graft-polyethylene oxide (Sigma 432784) | Sigma | 150,000 | 192,000 | 148,000 | None | 0 |
| 17 | SAP: Poly(acrylic acid), partial potassium salt (Sigma 435325) | Sigma | 40 | 136 | 480 | None | 11.5 |
| 18 | SAP: Poly(acrylamide-co-acrylic acid), potassium salt (Sigma 432776) | Sigma | 26,000 | 130,000 | 123,000 | None | 0 |
| 19 | SAP: Sodium polyacrylate, cross-linked (Luquasorb 1161) | BTC Europe/BASF | 434,000 | 350,000 | 378,000 | None | 0 |

Particle size determination : The average diameter of fertilizer particles is determined using a stack of standardized sieves DIN 4188 with a diameter of 20 cm and a height of 5 cm (made from stainless steel) having appropriate mesh sizes (such as, for example, a stack of 9 sieves with mesh sizes 1.6, 2.0, 2.5, 3.15, 3.55, 4.0, 4.5, 5.0 and 6.3 mm), put on a sieve vibrator, such as an Fritsch Analysette (about 3000 vibrations per minute). An amount of material (200 to 300 gram) is put in the top sieve and allowed to be sieved during about 5 minutes. After sieving, each fraction is weighted with an accuracy of about 0.1 gram. The average diameter is the mesh size at which the cumulative sum of the weight percentages of the respective sieve fractions adds up to 50 weight %.

CAN

To prepare 40 weight % CAN solution, 200 g of CAN were added to 300 g of water under continuous stirring. The solution turned murky grey. Particles were dissolving but some were also caught between the propeller and the bottom and partially crushed. Non-dissolved particles were visible after 5 min. Solution was stirred for 10 minutes and then transferred to a viscometer, where the viscosity (Disc S02, rpm 20) was determined to be 11.2 cP. The solution was then left to settle. Clear sedimentation occurred. After 35 minutes, the solution was carefully decanted and filtered. 390 ml of pale filtrate was recovered (78% recovery). The sediment was dried, weighed 38.5 g and contained some non-dissolved CAN particles indicating that a 40 weight % solution is oversaturated. In addition, 17.8 g of sediment was recov- Experiment 1.1 Gelling Agents in Water Without CAN All gelling agents were dissolved in water and the viscosity of stirred solution was measured at 5, 10 and 15 minutes. The solution were then left to settle for 30 minutes and filtered if possible, where the amount of filtrate is measured. The results are summarized in Table 1.

A. Superabsorbent Polymers

Superabsorbent polymers (SAP) are polymers that can absorb and retain extremely large amounts of a liquid, relative to their own mass. Water-absorbing polymers, which are classified as hydrogels when cross-linked, absorb aqueous solutions through hydrogen bonding with water molecules. A SAP's ability to absorb water is a factor of the ionic concentration of the aqueous solution. In deionized and distilled water, a SAP may absorb 500 times its weight (from 30-60 times its own volume) and can become up to 99.9% liquid, but when put into a 0.9% saline solution, the absorbency drops to maybe 50 times its weight. The presence of ions (or, more generally the increase in ionic strength) in the solution will impede the polymer's ability to bond with the water molecule.

Sample 15: Sodium Salt Of Poly(Isobutylene-Co-Maleic Acid)

Sample 15 comes in the form of fluffy fibres which make it unsuitable for coating application. However, it dissolved completely and almost instantaneously gelled to a thick gel. Viscometer disc had to be changed to S06 and rotation decreased to 1 rpm to be able to measure the viscosity. Gel did not settle, nor did it filter.

Sample 16: Polyacrylic Acid, Partial Sodium Salt-Graft Polyethylene Oxide

Sample 16 is a powder and formed a good dispersion, though it did not dissolve completely. In less than 1 minute, it formed a very thick gel which neither settled nor filtered. Disc S06 with 1 rpm was used for determination of viscosity.

Sample 17: Polyacrylic Acid, Partial Potassium Salt

Sample 17 formed a good dispersion but poor gel. Low viscosity gel did not settle but unlike other SAPs, yielded 11.5 ml of filtrate.

Sample 18: Poly(Acrylamide-Co-Acrylic Acid), Potassium Salt

Upon introduction into water, the powder fell to the bottom but then dispersed in the whole liquid volume. A "crystalline gel" developed after 4-5 minutes of stirring. The solid gel did not settle or filter. Disc S06 with 1 rpm was used for determination of viscosity.

Sample 19: Sodium Polyacrylate, Cross-Linked (Luquasorb 1161)

Upon introduction to water, the powder fell to the bottom but then dispersed in the whole liquid volume. An incredibly thick "crystalline gel" developed after 2 min of stirring. Parts of the gel were lost due to the chunks falling out of the beaker during removal of propeller for viscosity measurements. Solid gel did neither settle nor filter.

Summary: SAPs (with the exception of Sample 17) would seem as ideal candidates for the purpose of the application, however, unlike guar gum (see below) SAPs readily seem to redissolve in excess water. Without being bound by theory, SAPs can be seen as cross-linked "balls" that swell. Adding water fills up the voids between the balls and the SAP gel seems to dissolve, but actually the balls are becoming more separated in the water. On the contrary, guar/xanthan gums form a continuous network and their viscosity the just decreases upon addition of water by the dilution.

Thus, when water is added to the filter paper containing a SAP gel, the latter dissolves and water runs through the filter paper until the SAP gel forms again as the water in between the "balls" passes through the filter and the "balls" come into mutual contact again. It can be expected that ammonium nitrate can be thus washed out from the gel into the filtrate. If that is the case, the gel will represent a nuisance for the misuser and add extra cost in the form of extra water, but will not stop him from obtaining ammonium nitrate. Furthermore, the behaviour of SAPs in the presence of CAN has to be thoroughly investigated as the presence of ions (calcium, nitrate, ammonium) is supposed to suppress the gelling ability.

B. Guar Gum

Guar gum is a polysaccharide composed of the sugars galactose and mannose. Guar gum shows high low-shear viscosity but is strongly shear-thinning. It is very thixotropic above 1% concentration, but below 0.3%, the thixotropy is moderate. It is naturally well biodegradable, which is a benefit in agricultural applications.

Sample 1: Guar Gum

When a first attempt was made with 4 weight % of guar gum in water, the polymer quickly gelled and the measured viscosity (S06, 1 rpm) was 690 000 cP. The content of the beaker was an unfilterable pudding. Therefore, all subsequent tests were made with 1% polymer solutions in water. Sample 1 dissolved quickly in the water and formed a viscous liquid which grew even more viscous over time. The solution negligibly settled and remained homogeneous over the settling time of 30 min. It proved very difficult to filter: after 32 min and only 18 ml of filtrate was obtained. The filtrate was a clear slightly viscous fluid.

Sample 3: Water Block UFFHV Guar Gum

Some clumps were formed upon depositing in water. These clumps did not dissolve during the mixing process, thus perhaps indicating that 1% dosage can be lowered. Powder quickly gelled and its viscosity increased with time. Lower speed of 4 rpm had to be used to measure viscosity at t=15 min. Solution did not settle and proved nearly impossible to filter with only 6 ml of filtrate collected after 30 min.

Sample 4: Water Block PPN4000 Guar Gum

Some clumps were formed upon depositing in water. These clumps did not dissolve during the mixing process, thus perhaps indicating that 1% dosage can be lowered. Powder quickly gelled and its viscosity increased with time. Solution did not settle and proved nearly impossible to filter with only 6 ml of filtrate collected after 30 min.

Sample 5: Water Block DIF

Some brownish clumps were formed upon depositing in water. These clumps did not dissolve during the mixing process, thus perhaps indicating that 1 weight % dosage can be lowered. The powder quickly gelled and its viscosity increased with time. The solution did not settle and proved nearly impossible to filter with 8 ml of filtrate collected after 30 min.

Sample 7: Guar Gum GV23/2F

Some clumps were formed during dissolution. The powder gelled and did not settle. 6.5 ml of filtrate were obtained after 30 min of filtration.

Summary: All guar gums displayed favourable gelling properties with gel maintaining its consistence even when extra water was added. Large excess was required to break down the gel into lesser clumps but even then, the gel was not completely dissolved. This property is desirable with regard to protection of CAN against misuse.

C. Xanthan Gum

Xanthan gum is a polysaccharide that is secreted by the bacterium *Xanthomonas campestris*. It is composed of pentasaccharide repeat units, comprising glucose, mannose, and glucuronic acid in the molar ratio 2.0:2.0:1.0. It is produced by the fermentation of glucose, sucrose, or lactose. After a fermentation period, the polysaccharide is precipitated from a growth medium with isopropyl alcohol, dried, and ground into a fine powder. Later, it is added to a liquid medium to form the gum. Water Block WB2 is an artificial polymer developed as an alternative to guar gum after it has been taken in use extensively by oil industry in drilling applications. Water Block WB2 contains 44.4 weight % of carbon.

Sample 6: Water Block WB2 Xanthan Gum

The powder did not dissolve well in the water. It formed gelled clumps which mostly float on the water. To increase dispersion, the propeller was moved from the bottom to the top part of the solution between the first and second viscosity measurement. However, even then, the viscosity was much too low compared to guar gums. During the settling, most of the polymer was collected in the upper part of the beaker. The upper fraction was not easily filtered (30 ml/30 min), however could be decanted and then, the bottom liquid part filtered well (150 ml/30 min).

Summary: Water block has inferior gelling properties in water, mainly due to its floating. It may still be interesting to add the powder to the CAN particles and see how the polymer will behave then.

D. Salts of Alginic Acid

Alginic acid, also called algin or alginate, is an anionic polysaccharide distributed widely in the cell walls of brown algae, where it, through binding water, forms a viscous composition. In extracted form, it absorbs water quickly; it is capable of absorbing 200-300 times its own weight in water. Its colour ranges from white to yellowish-brown. It is sold in filamentous, granular or powdered forms.

Sample 12: Algenic Acid Sodium Salt, Low Viscosity.

Upon introduction into water, Sample 12 formed solid clumps which fell to the bottom, where they got stuck to the propeller. The while powder gelled, and had negligible effect on the viscosity of the bulk solution. Since the clumps got stuck to the propeller, there was nothing left to settle. Even though the solution filtered initially at slower rate than clay solutions (see below), most of the solution was filtered and 480 ml of filtrate was recovered.

Sample 13: Algenic Acid Sodium Salt, Very Low Viscosity

Upon introduction to water, Sample 12 formed solid clumps which mostly floated on the surface. Bulk solution did not gel and did not settle. Upon filtration, 480 ml of filtrate were recovered.

Sample 14: Sodium Alginate

Sample 14 formed large gelatinous clumps which floated on the surface of the solution. It was difficult to measure the bulk viscosity as the clumps tended to stick to the disc. The clumps remained to float during the settling. 405 ml of filtrate was recovered.

Summary: Sodium alginate did not perform well in the solution with water.

E. Bentonite

Bentonite is an absorbent aluminium phyllosilicate, essentially impure clay consisting mostly of montmorillonite. Bentonite is employed by industry to perform a multitude of jobs. Most industrial applications involve the gelling property of bentonite to form viscous water suspensions. Depending upon the relative proportions of clay and water, these mixtures are used as bonding, plasticizing, and suspending agents. Bentonites disperse into colloidal particles and, accordingly, provide large surface areas per unit weight of clay. This large surface area is a major reason why bentonite functions so well in stabilizing emulsions, or as a medium to carry other chemicals. Bentonites react chemically with many organic materials to form compounds which are used chiefly as gelling agents in a variety of organic liquids.

Sample 2: Bentonite, Sodium Form

Sample 2 does not dissolve readily in water. Most of the clay forms clumps which either sink to the bottom or float on the top of the solution. The solution's viscosity was only slightly higher than the viscosity of water (3.2 cP) and did not improve with time. The solution did not show significant settling, apart from the clay which has already sunk to the bottom during stirring. Solution filtered readily until clay blocked the filter paper pores, at which point 300 ml of filtrate was collected.

Sample 8: Bentonite

Sample 8 formed a grey dispersion with some clumps in the solution. The dispersion did not form a gel and partially settled to the bottom during the settling period. The solution filtered well until the clay sediment from the bottom clogged the filter. 390 ml of filtrate was recovered over 30 min.

Sample 9: Nanoclay Hydrophylic Bentonite

Sample 9 formed a pink dispersion with some of the powder settling on the bottom. No gel was developed. More material settled during the settling period. The dispersion filtered well until the filter paper pores were clogged. 350 ml of filtrate were recovered.

Summary: At tested conditions, Bentonite failed to form a gel and thus is not suitable for the invention.

F. Attagel 50 & 350

Attagel is a mineral gelling agent for application in agriculture, developed by BASF, and having ideally a chemical composition of : $3MgO-1.5Al_2O_3-8SiO_2-9H_2O$ (Attapulgite). The Attagel thickeners effectively form thixotropic colloidal gels in ionic and non-ionic aqueous solutions. They also develop thixotropic gels in most organic liquids to develop thickening and/or suspension properties when dispersed with various cationic or non-ionic surfactants.

Samples 10 & 11: Attagel 50 & 350

Both samples 10 and 11 formed milky grey suspensions with sediments in the bottom. Suspensions failed to gel and settled completely when left standing for 30 min. Liquid overhead was easily decanted and yielded 470 ml of filtrate.

Summary: Attagel is not suitable for the invention.

Experiment 1.2 Gelling Agents in a 20 Weight % CAN Solution

Based on viscosity measurements and powder appearance, 3 SAP's (Samples 16, 18 & 19) and the guar gum (Sample 3) were selected for further tests in CAN solutions. In addition, sodium alginate (Sample 14) and Water block Xanthan gum (Sample 6) were added with the expectation that dispersing them over CAN particles would improve their dispersion in the solution. Gelling agents were added to 100 g of CAN and were dispersed over the particles by shaking. Solids were dissolved in 400 g of water, thus forming a 20% CAN solution. The solution was stirred for 10 min—sufficient time for all CAN to dissolve—and then, viscosity was measured. The solution was then settled for 30 min and filtered for 30 min. The filtrate was evaporated to dryness and the precipitates were weighed. The results are presented in Table 2.

TABLE 2

| Nr. | Sample name | Supplier | Viscosity (cP) after 10 min | Settling after 30 min | Filtrate (ml) | Precipitate (g) | AN-recovery (%) |
|---|---|---|---|---|---|---|---|
| 3 | Water Block UFFHV Guar Gum | Rantex Corp. | 898 | None | 15 | 1 | 1.4 |
| 6 | Water Block WB2 Xanthan Gum | Rantex Corp. | 168 | None | 13 | 1 | 1.4 |
| 14 | Sodium alginate | VWR-Prolabo | 70.4 | 3 phases | 200 | 34 | 47.9 |
| 16 | SAP: Poly(acrylic acid), partial sodium salt-graft-polyethylene oxide (Sigma 432784) | Sigma | 16 | Partial | 330 | 55 | 77.5 |
| 18 | SAP: Poly(acrylamide-co-acrylic acid), potassium salt (Sigma 432776) | Sigma | 16 | Partial | 330 | 54 | 76.1 |
| 19 | SAP: Sodium polyacrylate, cross-linked (Luquasorb 1161) | BTC Europe/BASF | 15.6 | Partial | 330 | 50 | 70.4 |

It is at once apparent that the functionality of the SAPs, which seemed excellent candidates as gelling agents, is greatly reduced by the presence of ions in the solution. In the test, all SAPs gelled slightly and fell to the bottom. Hence, the presence of SAPs did reduce the recovery of ammonium nitrate with 30% but did not prevent the purification thereof. Furthermore, it is highly probable that remaining 30% can be recovered by washing the filter cake with water.

Sodium alginate settled in 3 phases, where sediments were on the bottom and most of the sodium alginate floated on top of the liquid phase. Floating alginate helped to clog the filter pores and thus slowed down the filtration. The filtrate, when dried at 104° C., did not yield crystalline white ammonium nitrate but rather a black mixture of ammonium nitrate with baked-in alginate. About 50% of ammonium nitrate was thus recovered. Alginate, though not preventing recovery of ammonium nitrate, renders the purification more difficult.

Both guar gum and xanthan gum worked very well in a 20 weight % CAN solution. Especially xanthan gum performed surprisingly well, because initially, the powder did not dissolve well in the water (see above, sample 6). The solutions did not settle and were very difficult to filter. Filtrate yielded only few grams of precipitate, which in addition was not clear, white crystalline ammonium nitrate but rather a mixture with the gelling agent.

Experiment 1.3 Gum Type Gelling Agents in a 20 Weight % CAN Solution

Minimum loading and effect of ion concentration were investigated for both gelling agents (Water Block UFFHV Guar Gum and Water Block WB2 Xanthan Gum) by varying the amount of gelling agent and CAN in water. The solutions were stirred for 10 minutes and their viscosity measured. The solution was then left to settle for 30 min and filtered in folded paper for 30 minutes. The volume of the filtrate was measured and the filtrate was evaporated to dryness at 104° C.

The solid thus precipitated was weighed. The results are presented in Table 3 and in FIG. 1.

It is apparent that:

1) Both gum type gelling agents function better in more concentrated CAN solutions. The improvement can likely be attributed to a salt-out effect, where high salt concentration leads to precipitation and bonding of the organic molecule of the gelling agent.

2) At low gelling agent loadings, xanthan gum provides more satisfactory results than guar gum.

3) Neither guar gum nor xanthan gum stick completely to CAN-particles and a fraction of the powder remained in the mixing vessel. Hence, if coating could be improved, even less polymer could be used. Based on these results, xanthan gum was chosen as the best candidate for further testing.

TABLE 3

| Polymer | Concentrations | | | Viscosity (cP) after 10 min | Settling after 30 min | Filtrate (ml) | Precipitate (g) | AN-recovery (%) |
| --- | --- | --- | --- | --- | --- | --- | --- | --- |
| | % agent/CAN | % agent/solution | % CAN/solution | | | | | |
| Xanthan Gum | 5 | 0.99 | 19.80 | 168 | None | 13 | 1 | 1.4 |
| Xanthan Gum | 2.5 | 0.50 | 19.90 | 110 | None | 21 | 2.2 | 3.1 |
| Xanthan Gum | 2.5 | 0.99 | 39.60 | 7,250 | None | 6.5 | 0 | 0 |
| Xanthan Gum | 1.25 | 0.25 | 19.95 | 64 | None | 70 | 11 | 15.5 |
| Xanthan Gum | 0.625 | 0.25 | 39.90 | 96 | None | 28 | 3 | 2.1 |
| Xanthan Gum | 1.25 | 0.50 | 39.80 | 260 | None | 12 | 1.5 | 1.1 |
| Guar Gum | 5 | 0.99 | 19.80 | 898 | None | 15 | 1 | 1.4 |
| Guar Gum | 2.5 | 0.50 | 19.90 | 144 | None | 30 | 3 | 4.2 |
| Guar Gum | 2.5 | 0.99 | 39.60 | 54,000 | None | 7 | 0 | 0 |
| Guar Gum | 1.25 | 0.50 | 39.80 | 239.2 | None | 17 | 2.64 | 1.9 |
| Guar Gum | 1.25 | 0.25 | 19.95 | 38 | Complete | 340 | 60 | 84.5 |
| Guar Gum | 0.625 | 0.25 | 39.90 | 90.4 | Partial | 140 | 48 | 33.8 |

Experiment 1.4 Xanthan Based Gelling Agents in a CAN Solution

The misuse of CAN by extraction of ammonium nitrate is prevalent in some countries at war or under insurrection and where it is available as fertilizer, and also among individual terrorist cells in western society. The isolation of ammonium nitrate is often performed on limited equipment, where time can play an important role, thus limiting the HME production. Hence, more means, more activity, and more time required for the extraction, will all increase the probability of being detected and identified. In addition, the CAN solution would be prepared as concentrated as possible, which is favourable for the intended application since ammonium nitrate is highly soluble in water and any water added upfront will require time and energy to be removed (see section above). Dissolution of larger quantities of CAN could be accelerated by using pre-warmed surface water. In this section, the effect of temperature on viscosity will be investigated. In addition, the behaviour of xanthan-based gum was investigated during dissolution, settling and filtration, carried out over 24 hours. The effect of vacuum filtration was also verified. For all experiments, Water Block WB2 Xanthan Gum was used.

Temperature

Hot tap water (T=62° C.) was used for the preparation of 20 weight % and 40 weight % CAN solution. 2.5 and 1.25 weight % to CAN of xanthan based gum was added. Even though the CAN dissolves faster in hot water, temperature has no effect on the function of xanthan based gum as can be seen from the results, presented in Table 4.

TABLE 4

| Polymer | Concentrations | | | Viscosity (cP) after 10 min | Settling after 30 min | Filtrate (ml) | Precipitate (g) | AN-recovery (%) |
| --- | --- | --- | --- | --- | --- | --- | --- | --- |
| | % agent/CAN | % agent/solution | % CAN/solution | | | | | |
| Xanthan Gum | 1.25 | 0.50 | 39.80 | 260 | None | 12 | 1.5 | 1.1 |
| Xanthan Gum | 2.5 | 0.50 | 19.90 | 110 | None | 22 | 2.2 | 3.1 |

Time

Solutions of 2.5 g and 100 g or 200 g of CAN, dissolved in 400 g or 300 g of water were prepared.

Mixing

Solutions were stirred vigorously with a glass rod and left at room temperature for 24 hours. While the CAN in the 20 weight % solutions dissolved completely and formed a 3-layered suspension with xanthan gum mostly on top and the insoluble dolomite on the bottom, there were small white particles left in the 40 weight % solution, thus indicating that CAN was not completely dissolved. The separation of phases was not so pronounced in 40 weight % solution.

Settling

Solutions were stirred mechanically for 10 min to dissolve all CAN and left to settle for 24 hours. While 20 weight % CAN solution developed a 3-phase system with xanthan gum in the top layer and insoluble material in the bottom layer, the 40 weight % solution remained a homogeneous solution with an apparent gradual increase in density from top to bottom.

Prolonged Filtration

Solutions were mechanically stirred for 10 min and immediately filtered without any settling. Filtration lasted 24 hours. Results are presented in Table 5. In addition to ammonium nitrate recovered from the filtrate, it was possible to obtain about 3 and about 8 g of pure AN crystals from 20 weight % and 40 weight % CAN solutions respectively, which crystallized on the rim of the filtration paper. The solutions from mixing experiments containing 2.5 g of xanthan gum were filtered for 67 hours through folded filtration paper. The results are also shown in Table 5. Once again, ammonium nitrate crystallized as a crust on the edge of filtration paper. It is apparent from the results that the amount of recoverable ammonium nitrate is limited to about 12% and 25% depending on CAN concentration and does not linearly increase with increasing filtration time. Though very tedious, it is possible to increase the yield of ammonium nitrate by continuously removing the crust from the filtration paper and thus allowing more nitrate to crystallize.

Vacuum Filtration

CAN solutions from the settling experiment above were filtered for 30 min through a funnel, connected to an aspirator. Initial results presented in Table 6 showed a 3-fold higher yield compared to atmospheric filtration. Therefore, an additional test was conducted, where 40 weight % and 20 weight % CAN solutions were filtered for about 6 hours under vacuum. Ammonium nitrate recovery reached 20% and 40% respectively. Additional ammonium nitrate could surely be recovered by pouring the remaining solution on the fresh filtration paper. Thus, the gelling agent will not prevent obtaining purified ammonium nitrate by vacuum filtration. However, it must be remembered, that such filtration adds complexity, requires either a vacuum pump or a larger quantity of running water, and both delay the reprocessing process and ease its identification.

TABLE 5

| Polymer | Concentrations | | | Filtration after | | Precipitate (g) | AN-recovery (%) |
| --- | --- | --- | --- | --- | --- | --- | --- |
| | % agent/CAN | % agent/solution | % CAN/solution | 24 hours | 67 hours | | |
| Xanthan Gum | 1.25 | 0.50 | 39.80 | 48 | — | 17.4 | 12.3 |
| Xanthan Gum | 2.5 | 0.50 | 19.90 | 92.5 | — | 14.9 | 21.0 |
| Xanthan Gum | 1.25 | 0.50 | 39.80 | — | 25 | 16.3 | 11.5 |
| Xanthan Gum | 2.5 | 0.50 | 19.90 | — | 65 | 17.8 | 25.1 |

TABLE 6

| Polymer | Concentrations | | | Settling after 24 hours | Vacuum filtration | | Precipitate (g) | AN-recovery (%) |
| --- | --- | --- | --- | --- | --- | --- | --- | --- |
| | % agent/CAN | % agent/solution | % CAN/solution | | Time (min) | Filtrate (ml) | | |
| Xanthan Gum | 1.25 | 0.50 | 39.80 | Partial | 30 | 30 | 9.9 | 7.0 |
| Xanthan Gum | 2.5 | 0.50 | 19.90 | 3 phases | 30 | 40 | 6.7 | 9.4 |
| Xanthan Gum | 1.25 | 0.50 | 39.80 | N/A | 400 | 54 | 28.6 | 20 |
| Xanthan Gum | 2.5 | 0.50 | 19.90 | N/A | 370 | 158 | 31.1 | 44 |

Example 3

Comparison of Different Types of Xanthan Gum

Different types of xanthan gums from different manufacturers were analysed and their properties compared (Table 7).

CAN without coating, supplied from Rostock, was used. Xanthan types and suppliers thereof are listed below.

TABLE 7

Different types of xanthan gums from different manufacturers

| Supplier | Country | Xantham type |
|---|---|---|
| Rantec Corp | USA | WB2 |
| Sigma Aldrich | — | G1253-500g |
| Jungbunzlauer | Switzerland | XGT TFST |
| ADM | USA | Optixan 40 |
|  |  | Optixan D |
| CP Kelko | USA | Kelzan |
| Cargill | USA | Verxan S80 |
| Vanderbilt | USA | Vanzan |

Vanderbilt (http://www.vanderbiltminerals.com/ee_content/Documents/Technical/VANZAN_Brochure_English_Web.pdf) claimed a synergistic effect of xanthan gum with magnesium aluminium silicate clays at a recommended ratio of 1:10 xanthan:clay. The corresponding tests were therefore also conducted with Veegum and VanGel as clay samples.

Test method

Two levels of CAN/Xanthan loading were selected: concentrated CAN/Xanthan solution and diluted CAN/Xanthan solution.

The calculated amount of CAN was weighted and the required amounts of xanthan (or xanthan and clay) were added to the CAN in a plastic jar to achieve a desired loading.

The powder was dispersed by vigorous shaking the jar. Contents of the jar were then transferred to calculated amounts (ml) of water while stirring. The solution was mechanically stirred for 10 min, during which all CAN dissolved and viscosity could be measured using a Brookfield viscometer equipped with SO2 spindle.

After recording the viscosity, the solution was allowed to settle for 30 minutes and visual observation was recorded.

Roughly folded Schleicher & Schuell 520 B1/2 filter paper in an ordinary PE funnel was used for filtration. The amount of filtrate after 30 min was measured. The filtrate was evaporated to dryness in a heated cabinet (100° C.) overnight, the solid precipitate was weighed and the amount of recovered AN was calculated.

Results

The results, shown in Table 8, show that addition of xanthan prevents very well the recovery of ammonium nitrate in concentrated solutions. All Xanthan gums performed well. To prevent recovery from diluted solutions is challenging and Rantec Corp product does the best job. However, based on the second-best and satisfactory results achieved with xanthan from Jungbunzlauer, it can be concluded, in general, that a Xanthan gum can be used for hindering the AN recovery from CAN solutions. On the other hand, the addition of clay at given low shear rates did not further improve the performance of xanthan gum.

TABLE 8

Different types of xanthan gums tested

| | Concentration | | | Viscosity (cP) | Settling | Filtration (ml) | | NH4NO3 |
| | % Polymer/ | % polymer/ | % CAN/ | Time (min) | | | Precipitate | recovery |
| Polymer | CAN | solution | solution | 10 | 30 | 30 | (g) | (%) |
|---|---|---|---|---|---|---|---|---|
| Rantec WB2 | 2.5 | 0.99 | 39.60 | 2192 | None | 15 | 1.52 | 1.1% |
|  | 1.25 | 0.25 | 19.95 | 44.4 | Partial | 105 | 15.42 | 21.7% |
| Sigma Aldrich | 2.5 | 0.99 | 39.60 | 1128 | None | 15 | 1.56 | 1.1% |
|  | 1.25 | 0.25 | 19.95 | 24.8 | Partial | 205 | 32.94 | 46.4% |
| Jungbunzlauer | 2.5 | 0.99 | 39.60 | 704 | None | 16 | 2.14 | 1.5% |
|  | 1.25 | 0.25 | 19.95 | 26.8 | Partial | 130 | 20.41 | 28.7% |
| ADM Optixan D | 2.5 | 0.99 | 39.60 | 1700-7960* | None | 6 | 0.93 | 0.7% |
|  | 1.25 | 0.25 | 19.95 | 31.6 | Yes | 200 | 33.83 | 47.6% |
| ADM Optixan 40 | 2.5 | 0.99 | 39.60 | 1328 | None | 12 | 1.73 | 1.2% |
|  | 1.25 | 0.25 | 19.95 | 26.8 | Yes | 300 | 48.01 | 67.6% |
| CP Kelko Kelzan | 2.5 | 0.99 | 39.60 | 1480 | None | 15 | 1.85 | 1.3% |
|  | 1.25 | 0.25 | 19.95 | 26 | Yes | 260 | 41.31 | 58.2% |
| Cargill Verxan S80 | 2.5 | 0.99 | 39.60 | 336 | None | 20.5 | 2.86 | 2.0% |
|  | 1.25 | 0.25 | 19.95 | 26.8 | Yes | 260 | 41.8 | 59% |
| Vanderbilt Vanzan | 2.5 | 0.99 | 39.60 | 464 | None | 20 | 2.69 | 1.9% |
|  | 1.25 | 0.25 | 19.95 | 23.2 | Yes | 260 | 40.57 | 57.1% |
| Vanzan + Veegum | 2.5 | 0.99 | 39.60 | 88 | None | 38 | 7.99 | 5.6% |
|  | 1.25 | 0.25 | 19.95 | 20.8 | Yes | 320 | 53.5 | 75.4% |
| Vanzan + VanGel | 2.5 | 0.99 | 39.60 | 128 | None | 33 | 6.98 | 4.9% |
|  | 1.25 | 0.25 | 19.95 | 22 | Yes | 310 | 52.18 | 73.5% |

*Viscosity was gradually increasing and went over the limits of the viscometer after 20 min.

Example 4

N-Leaching of CAN

A sample of CAN-fertilizer was treated externally with different amounts of Water Block WB2. 10 g of CAN-fertilizer treated with respectively 0, 1, 2 and 5 weight % of Water Block WB2 were placed on a Buchner with filter, and exposed for several days at a temperature of 20° C. and a relative air humidity of 80%, in order to simulate atmospheric conditions exceeding the critical relative humidity (CRH) of the solid fertilizer composition. The CRH is a criteria that is often used in the fertilizer industry. It corresponds to the relative humidity (RH) of air when a product starts absorbing moisture exponentially. It is expressed in %. In this example, the RH of the air was fixed at 80%, meaning that the CAN-sample absorbs water exponentially and turns liquid. The liquid can pass the filter and is recovered in a vessel below.

A comparison was made of the behaviour of different samples of granules of CAN-fertilizer without and with 1 weight % Water Block WB2 gelling agent during a couple of days. The following was observed:

After 1 day, the granules of the samples with and without Water Block WB2 gelling agent looked wet and shiny.

After 3 days, liquid was present in the vessels below for the samples without and with 1% gelling agent.

After 5 days, the CAN-fertilizer without Water Block WB2 gelling agent was totally dissolved, and the dolomite remained on the filter. The samples of CAN-fertilizer with 1, 2 and 5 weight % of Water Block WB2 gelling agent turned into a kind of gelled mud. Some liquid passed through the filter for the sample with 1 weight % gelling agent. No liquid passed through the filter for the samples with 2 and 5 weight % of gelling agent.

Figure 2:
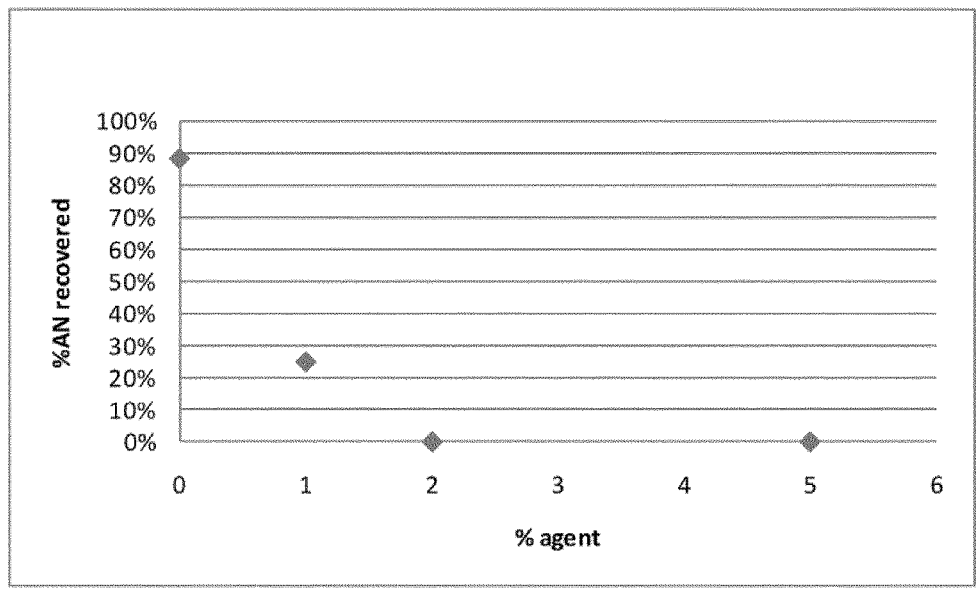
FIG. 2 illustrates % AN recovered versus % agent added in Example 4.

The recovered solution was analysed (quantity and concentration). The results were the following (see FIG. 2):

for the sample of CAN-fertilizer without Water Block WB2 gelling agent, 88% of the AN was recovered, the rest of the AN remaining in the wet dolomite and wet filter.

the CAN-fertilizer treated with 1 weight % Water Block WB2 gelling agent gave an AN-recovery of 25%;

for the CAN-fertilizers treated with 2 weight % and 5 weight %, no AN was recovered.

Example 5

Different solutions of CAN in water were prepared using the xanthan-based gelling agent Water Block WB2 from the firm Rantec Corporation at a fixed concentration of 5 weight % versus varying amounts of CAN. The different amounts of CAN in the solution were 10 weight %, 5 weight % and 1 weight %. Thereafter, the solutions were filtered and the AN recovery yield was compared, as summarized in Table 9 below.

TABLE 9

Recovery yield of AN (in %) with different weight % of CAN in an aqueous CAN solution

| | Weight % of CAN in the solution | | |
|---|---|---|---|
| | 10 weight % | 5 weight % | 1 weight % |
| Recovery yield (%) | 35% | 44% | 87% |

As can be seen from Table 9 above, when using the xanthan-based gelling agent Water Block WB2 in a CAN fertilizer composition, the recovery yield remains very low as long when the solution is at a concentration of some percentages (%). At 1 weight % CAN in the aqueous solution, the recovery yield is very high.

From these results, it can be concluded that, if someone would like to recover AN out of a fertilizer composition with WB2 as the gelling agent by dissolution of water, the product has to be overdiluted. As a consequence, the recovered solution is typically about 10 times larger, consequently costing 10 times more to reconcentrate in terms of time, effort and energy, thus increasing the probability of being detected because of a more complex and delayed reprocessing. The easy of misuse of the AN-fertilizers as a basis for HME's is in this way strongly hampered.

The invention claimed is:

1. A solid, particulate, non-explosive composition comprising ammonium nitrate-based particles and such an amount of a gelling agent that a substantially water-insoluble and non-filterable hydrogel is formed after said solid composition is contacted with water, wherein said solid composition has a maximum organic carbon content of 0.4 weight % and an average particle size of at least 1 mm.

2. The composition according to claim 1, wherein said average particle size of the solid composition is an average diameter as determined by sieving, ranging from 1 to 25 mm.

3. The composition according to claim 1, wherein said gelling agent is selected from the group consisting of gum-based gelling agents.

4. The composition according to claim 1, wherein said gelling agent is selected from the group consisting of xanthan gum-based gelling agents and guar gum-based gelling agents.

5. The composition according to claim 1, wherein said ammonium nitrate-based particles comprise a coating of the gelling agent.

6. The composition according to claim 1, wherein said composition comprises the gelling agent integrated within the ammonium nitrate-based particles.

7. The composition according to claim 1, wherein said composition is a physical blend of said ammonium nitrate-based particles and gelling agent particles of similar appearance.

8. The composition according to claim 4, wherein the amount of xanthan gum-based gelling agent or guar gum-based gelling agent is selected to a maximum of approximately 0.7 weight %, relative to the total weight of the composition.

9. The composition according to claim 1, wherein said contacting with water is done by dissolving, dispersing, storing or (fine) grinding.

10. The composition according to claim 2, wherein said average particle size of the solid composition is an average diameter as determined by sieving, ranging from 2 to 8 mm.

11. The composition according to claim 4, wherein said gelling agent is a xanthan gum-based gelling agent.

12. A method for limiting misuse of a composition comprising ammonium nitrate-based particles as an explosive composition, said method comprising:
providing ammonium nitrate-based particles; and
adding a gelling agent to the ammonium nitrate-based particles to form a solid, particulate, non-explosive composition,
wherein the gelling agent is added in such an amount that a substantially water-insoluble and non-filterable hydrogel is formed if said composition is contacted with water.

13. The method according to claim 12, wherein said solid, particulate, non-explosive composition has a maximum organic carbon content of 0.4 weight %.

14. The method according to claim 12, wherein said gelling agent is selected from the group consisting of gum-based gelling agents.

15. The method according to claim 12, wherein said gelling agent is selected from the group consisting of xanthan gum-based gelling agents and guar gum-based gelling agents.

16. A method for producing a solid, particulate, non-explosive composition, comprising ammonium nitrate-based particles and a gelling agent, comprising the consecutive steps of:
providing ammonium nitrate-based particles;
providing a gelling agent in powder form; and
mixing said powder in such an amount with said ammonium nitrate-based particles that a substantially water-insoluble and non-filterable hydrogel is formed if said solid composition is contacted with water, wherein said solid composition obtained has an average particle size of at least 1 mm and a maximum organic carbon content of 0.4 weight %.

17. A method for producing a solid, particulate, non-explosive composition, comprising ammonium nitrate-based particles and a gelling agent, comprising the consecutive steps of:
providing ammonium nitrate-based particles;
providing a suspension of a gelling agent, suspended in a liquid; and
spraying said suspension with such an amount of gelling agent onto said ammonium nitrate-based particles that a substantially water-insoluble and non-filterable hydrogel is formed if said solid composition is contacted with water,
wherein said solid composition obtained has an average particle size of at least 1 mm and a maximum organic carbon content of 0.4 weight %.

18. A method for producing a solid, particulate, non-explosive composition, comprising ammonium nitrate-based particles and a gelling agent, comprising the consecutive steps of:
providing an ammonium nitrate-based melt comprising a gelling agent; and
granulating said melt, thus producing ammonium nitrate-based particles comprising said gelling agent in such an amount that a substantially water-insoluble and non-filterable hydrogel is formed if said solid composition is contacted with water,
wherein said solid composition obtained has an average particle size of at least 1 mm and a maximum organic carbon content of 0.4 weight %.

19. A method of fertilization, wherein the solid composition according to claim 1 is applied as a non-explosive fertilizer composition, and wherein the potential misuse of the composition as a precursor for an explosive composition is limited.

20. The method according to claim 19, wherein said non-explosive fertilizer composition is selected from the group consisting of a straight N-fertilizer, a CAN-fertilizer, an NPK-fertilizer, an NP-fertilizer, a high N-NPK-fertilizer, and mixtures thereof.

21. The method according to claim 19, wherein the fertilizer composition is a slow release, a sustained release or a controlled release ammonium-nitrate based fertilizer.

* * * * *